Nov. 25, 1958 T. A. CONSIDDER 2,861,611
HOPPER FOR ROTARY MOWERS
Filed Sept. 15, 1955

INVENTOR.
THEODORE A. CONSIDDER
BY
ATTORNEY

United States Patent Office 2,861,611
Patented Nov. 25, 1958

2,861,611

HOPPER FOR ROTARY MOWERS

Theodore A. Considder, Cortland, Ohio

Application September 15, 1955, Serial No. 534,459

3 Claims. (Cl. 146—124)

This invention relates to rotary lawn mowers and more particularly to a hopper attachment therefor which will permit various items such as corn stalks, leaves, and other organic material to be fed into the rotating blade of the mower and cut up thereby while the mower is in use as a lawn mower.

The principal object of the invention is the provision of a hopper attachment for a rotary lawn mower.

A further object of the invention is the provision of a rotary lawn mower incorporating a rotating blade and a housing thereover and a hopper on said housing communicating with an opening therein so that various items may be positioned in the hopper and moved into the area of the rotating blade for cutting and distribution thereby.

A still further object of the invention is the provision of a lawn mower and hopper enabling the lawn mower to be used for cutting up various articles.

A still further object of the invention is the provision of a simple and inexpensive rotary lawn mower and corn stalk chopping device.

The hopper for rotary mowers disclosed herein comprises an improvement in the art relating to rotary lawn mowers and particularly in that a hopper is associated therewith and so arranged that elongated articles such as corn stalks and the like as well as other articles of different configurations may be fed into the rotating blade of the rotary lawn mower and chopped up thereby.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the junction and scope of the invention.

The invention is illustrated in the accompanying drawing, wherein.

Figure 1:
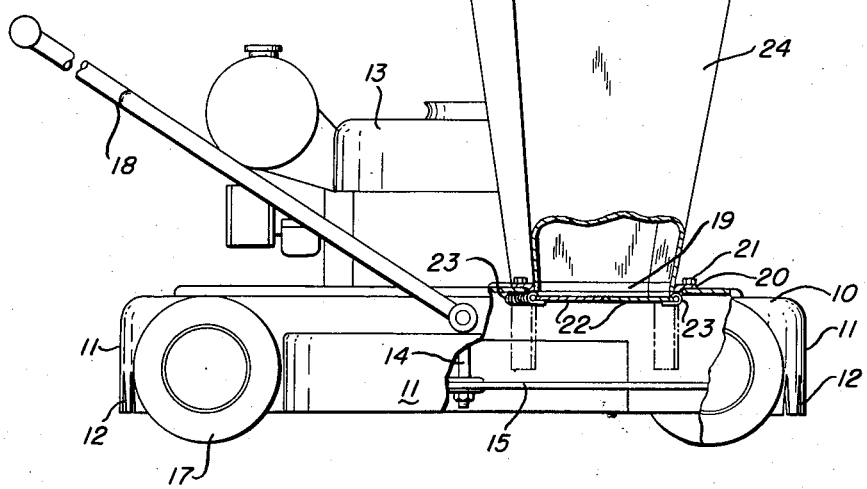
Figure 1 is a side elevation with parts broken away and parts in cross section illustrating the rotary mower and hopper.

By referring to the drawings and Figure 1 in particular it will be seen that a rotary lawn mower is disclosed which comprises a housing 10 of generally circular shape having depending flanges 11 thereabout. The front and back edges of the flanges 11 are notched as at 12—12 and the upper portion of the housing 10 supports an engine 13 which has a driven shaft 14 depending therefrom, passing through the housing 10 and mounting a blade 15 adjacent the lower end thereof. The blade 15 is thus adapted to be rotated by the engine 13 when operating.

The housing 10 has a plurality of outwardly extending stub axles 16 each of which has a ground engaging wheel 17 thereon and a handle 18 is pivoted to the housing so that the device may be propelled across a lawn to be cut, as is customary.

The housing 10 is provided in its upper portion adjacent the engine 13 with an opening 19 which is directly above the path of the blade 15. A flanged collar 20 is secured to the housing 10 about the opening 19 by fasteners 21 and supports a pair of hinged doors 22 which normally close the opening 19. The hinged doors 22 are spring biased to closed position by springs 23 positioned about the hinge pins on the collar 20 and on which the doors 22 are movably positioned.

Dotted lines in Figure 1 of the drawings show the open position of the doors to which position they may be moved by objects positioned in a chute-like hopper 24 which is detachably secured to the collar 20 and stands substantially vertically thereabove.

The rotary lawn mower may be used for cutting grass with the hopper 24 in position and the doors 22 closed or the hopper 24 may be removed if desired.

Figure 2:
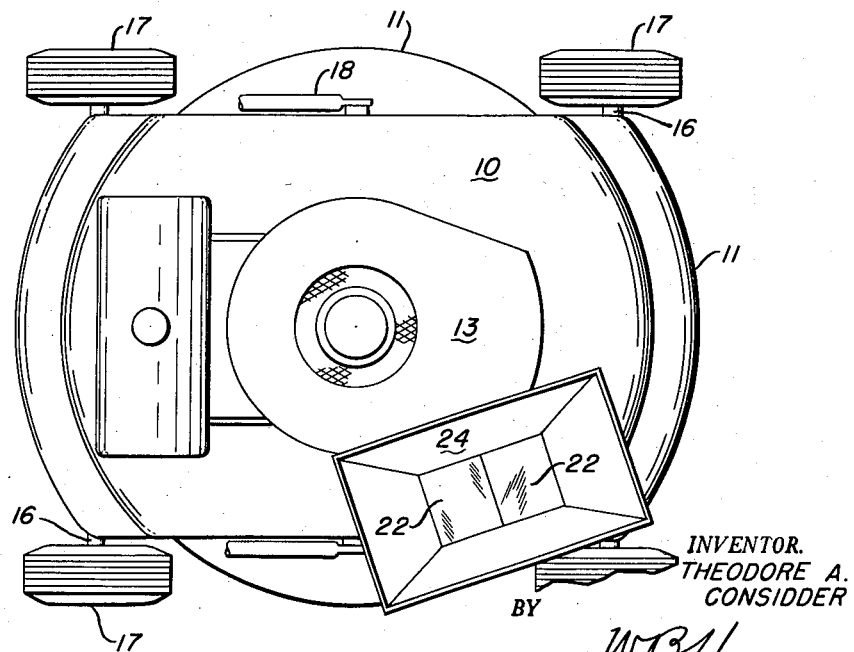
Figure 2 is a top plan view of the rotary lawn mower and hopper.

When the rotary mower is used for cutting corn stalks and other articles, the hopper 24 is installed, as shown in Figures 1 and 2 of the drawings, and the corn stalks or other articles are positioned in the hopper 24 and urged downwardly between the hinged doors 22 and into the blade 15 which is being rotated by the engine 13. The blade 15 throws the cut portions of the articles being presented thereto out from under the housing 10 and the device is thereby usable for various purposes other than cutting grass as originally intended. It will occur to those skilled in the art that a lawn may be simultaneously cut and mulched with the device of the invention by placing mulching material such as leaves in the chute-like hopper 24 while the mower is moved across the lawn.

It will thus be seen that the several objects of the invention are met by the provision of the hopper in registry with the access opening 19 in the housing 10 of the lawn mower and through which hopper various articles to be cut can be positioned for progressive presentation to the rotating blade 15 of the rotary mower.

Having thus described my invention, what I claim is:

1. A rotary lawn mower including a housing, a blade rotatably positioned on a vertical axis within said housing, means on said housing for rotating said blade, said housing having an opening therein above said blade and guide means in said opening for receiving articles to be cut, said guide means including members normally closing said opening and movable to open position by said articles.

2. The combination of a rotary power mower having a housing with an opening therein, a rotary blade positioned on a vertical axis in said housing and means on said housing for rotating said blade, and a hopper on said housing standing vertically thereabove and in registry with said opening in said housing and above said blade, doors on said housing in said opening and normally closing the same and movable out of said opening to permit articles deposited in said hopper to move downwardly therethrough into engagement with said rotary blade.

3. A chute-like hopper attachment for a rotary blade lawn mower having a housing with an opening therethrough and a rotary blade therein beneath said opening in an off center relation thereto; said hopper attachment comprising a collar positioned on said housing about said opening and a chute open at its opposite ends detachably secured to said collar and standing thereabove and for the reception of articles to be cut by said rotary blade and wherein said collar is provided with hinge formations and doors are secured to said hinge formations and normally biased to closed position.

References Cited in the file of this patent

UNITED STATES PATENTS

| | | |
|---|---|---|
| 1,876,409 | Gordon | Sept. 6, 1932 |
| 2,265,658 | Welander | Dec. 9, 1941 |
| 2,639,096 | Hinerfeld | May 19, 1953 |
| 2,719,556 | Summerville et al. | Oct. 4, 1955 |
| 2,742,751 | Laughlin | Apr. 24, 1956 |